(12) United States Patent
Huang et al.

(10) Patent No.: US 9,285,914 B2
(45) Date of Patent: Mar. 15, 2016

(54) ANISOTROPIC TOUCHSCREEN

(75) Inventors: Chun-Lung Huang, Hsinchu (TW);
Po-Yang Chen, Hsinchu (TW);
Chien-Yung Cheng, Hsinchu (TW);
Po-Sheng Shih, Hsinchu (TW)

(73) Assignee: Shih Hua Technology Ltd., Zhubei, Hsinchu County (TW)

( * ) Notice: Subject to any disclaimer, the term of this patent is extended or adjusted under 35 U.S.C. 154(b) by 343 days.

(21) Appl. No.: 13/477,266

(22) Filed: May 22, 2012

(65) Prior Publication Data
US 2012/0306808 A1     Dec. 6, 2012

(30) Foreign Application Priority Data

Jun. 3, 2011 (TW) .............................. 100119581 A

(51) Int. Cl.
*G06F 3/044* (2006.01)
*G06F 3/041* (2006.01)

(52) U.S. Cl.
CPC .............. *G06F 3/0416* (2013.01); *G06F 3/044* (2013.01)

(58) Field of Classification Search
USPC ..................... 345/173–178; 178/18.01–20.01
See application file for complete search history.

(56) References Cited

U.S. PATENT DOCUMENTS

| 2008/0158198 A1* | 7/2008 | Elias .............................. 345/174 |
| 2009/0267914 A1* | 10/2009 | Dews et al. ................... 345/173 |
| 2010/0328258 A1* | 12/2010 | Cheng et al. .................. 345/174 |
| 2011/0007026 A1 | 1/2011 | Chen et al. |
| 2011/0069035 A1 | 3/2011 | Chen et al. |
| 2011/0205181 A1* | 8/2011 | Nagata et al. ................. 345/174 |
| 2011/0216035 A1* | 9/2011 | Shih et al. ..................... 345/174 |

FOREIGN PATENT DOCUMENTS

| CN | 101943967 A | 1/2011 |
| CN | 102478988 A | 5/2012 |

* cited by examiner

*Primary Examiner* — Quan-Zhen Wang
*Assistant Examiner* — Chad Dicke
(74) *Attorney, Agent, or Firm* — Novak Druce Connolly Bove + Quigg LLP

(57) ABSTRACT

A method for detecting a touch spot of the touch panel includes the following steps. The electrode pairs are scanned along the impedance direction to obtain an electrical signal curve for determining a first coordinate. A number of first driving electrodes and a number of second driving electrodes near the first coordinate are selected. The selected first driving electrodes are scanned to obtain a first sensing signal. The selected second driving electrodes are scanned to obtain a second sensing signal. A second coordinate is determined according to the first and second sensing signals. Finally, the touch spot is determined according to the first and second coordinates.

14 Claims, 13 Drawing Sheets

ANISOTROPIC TOUCHSCREEN

CROSS-REFERENCE TO RELATED APPLICATIONS

This application claims all benefits accruing under 35 U.S.C. §119 from Taiwan Patent Application No. 100119581, filed on Jun. 3, 2011 in the Taiwan Intellectual Property Office, the disclosure of which is incorporated herein by reference.

BACKGROUND

1. Technical Field

The present disclosure relates to a method for detecting a touch spot of a touch panel.

2. Description of Related Art

Touch sensing technology is capable of providing a natural interface between an electronic system and a user, and has found widespread applications in a variety of fields, such as mobile phones, personal digital assistants, automatic teller machines, game machines, medical devices, liquid crystal display devices, computing devices, and the like.

There are different types of touch panels for detecting a touch spot, for example, a capacitive touch panel.

Capacitive touch panels including transparent conductive films are widely used in various fields due to their high sensitivity. However, the resistance distribution of the transparent conductive film is non-uniform so the precision in detecting a touch spot is reduced.

What is needed, therefore, is to provide a method for detecting a touch spot of a touch panel that can overcome the above-described shortcomings.

BRIEF DESCRIPTION OF THE DRAWINGS

Many aspects of the disclosure can be better understood with reference to the drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
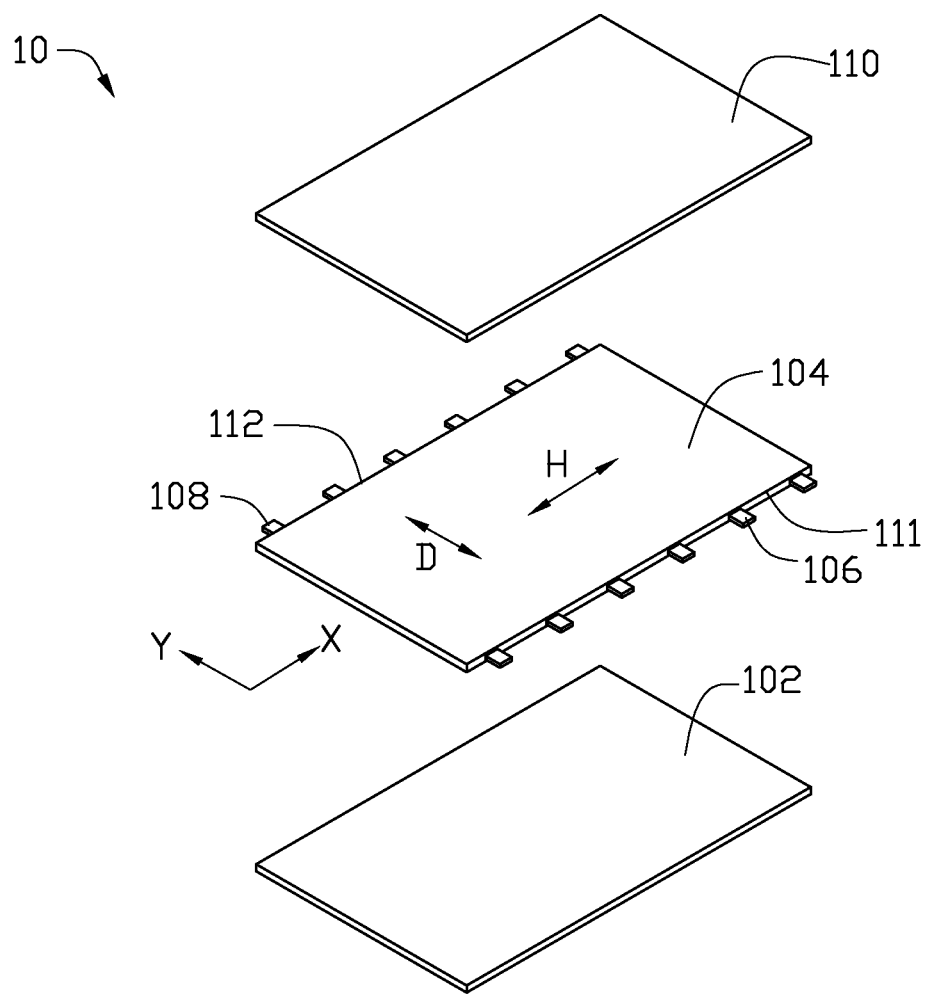
FIG. 1 is a schematic view of one embodiment of a touch panel.

According to one embodiment, a touch panel 10 as illustrated in FIG. 1 includes a substrate 102, a conductive film 104 with anisotropic impedance, a number of first driving electrodes 106, a number of second driving electrodes 108, and a transparent cover layer 110. The conductive film 104 defines a first impedance direction H and a second impedance direction D substantially perpendicular to the first impedance direction H due to the anisotropic impedance. Furthermore, the conductive film 104 includes a first side 111 and a second side 112 opposite to the first side 111. The first side 111 and the second side 112 are substantially parallel to the first impedance direction H. The first driving electrodes 106 are disposed at the first side 111 of the conductive film 104 with a regular interval and electrically connected to the conductive film 104. Similarly, the second driving electrodes 108 are disposed at the second side 112 of the conductive film 104 with a regular interval and electrically connected to the conductive film 104. The first impedance direction H is substantially parallel to an X axis shown in FIG. 1. The second impedance direction D is substantially parallel to a Y axis shown in FIG. 1.

Figure 2:
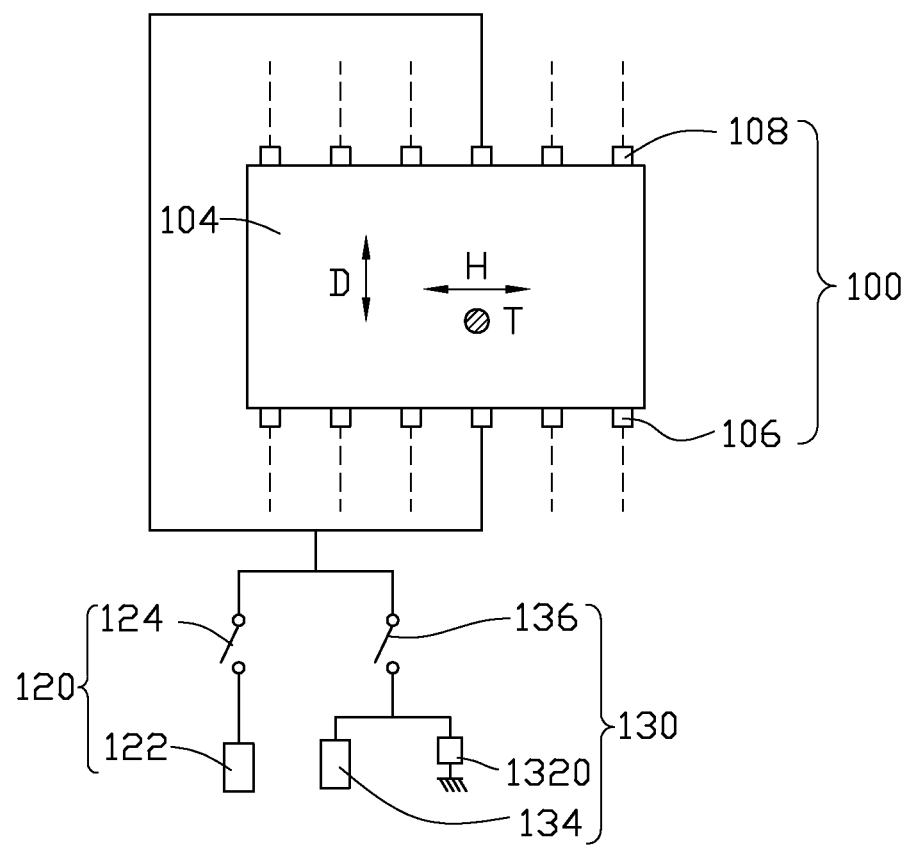
FIG. 2 is a schematic view of one embodiment of scanning an electrode pair of the touch panel shown in FIG. 1.

Referring to FIG. 2, the first driving electrodes 106 are respectively aligned with the second driving electrodes 108 to form a number of electrode pairs 100. The touch panel 10 further includes a driving circuit 120 and a sensing circuit 130. The driving circuit 120 and the sensing circuit 130 are electrically connected to the first driving electrodes 106 and the second driving electrodes 108 to detect a touch spot T of the touch panel 10.

The driving circuit 120 includes a charge circuit 122 and a first switch 124. The charge circuit 122 is controlled to separately connect or disconnect to or from the first driving electrodes 106 and the second driving electrodes 108 by the first switch 124. The sensing circuit 130 includes a storage circuit 1320, a readout circuit 134, and a second switch 136. The storage circuit 1320 is connected in parallel to the readout circuit 134. The storage circuit 1320 is controlled to separately connect or disconnect to or from the first driving electrodes 106 and the second driving electrodes 108 by the second switch 136. Similarly, the readout circuit 134 is also controlled to separately connect or disconnect to or from the first driving electrodes 106 and the second driving electrodes 108 by the second switch 136.

Figure 3:
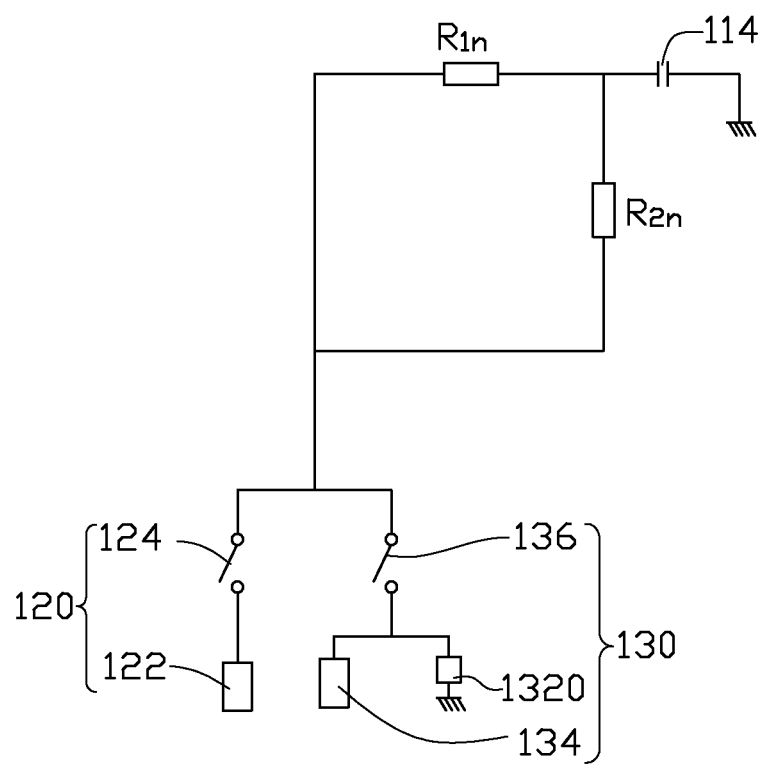
FIG. 3 is a circuit diagram of one embodiment of scanning the electrode pair of the touch panel shown in FIG. 1.

Referring to FIG. 3, when a conductive subject (not shown) is near or touches the touch panel 10, the touch spot T of the touch panel 10 and the conductive subject form a coupled capacitance 114 with a capacitance value C. The touch spot T of the touch panel 10 and the first driving electrodes 106 respectively form a number of resistance values $R_{11}$, $R_{12}, \ldots, R_{1n}$. The touch spot T of the touch panel 10 and the second driving electrodes 108 respectively form a number of resistance values $R_{21}, R_{22}, \ldots, R_{2n}$. The touch spot T of the touch panel 10 and the electrode pairs 100 respectively form a number of resistance values $R_1, R_2, \ldots, R_n$. A relationship between $R_n$, $R_{1n}$, and $R_{2n}$ satisfies an equation $$\frac{1}{R_{1n}} + \frac{1}{R_{2n}} = \frac{1}{R_n}.$$

In the equation, n is the number of the electrode pairs 100.

More specifically, the resistance values $R_{11}, R_{12}, \ldots, R_{1n}$ are different because the first driving electrodes 106 are disposed at different locations on the first side 111 of the conductive film 104. Similarly, the resistance values $R_{21}, R_{22}, \ldots, R_{2n}$ are different because the second driving electrodes 108 are disposed at different locations on the second side 112 of the conductive film 104. A number of first resistor-capacitor values $R_{11}C, R_{12}C, \ldots, R_{1n}C$ can be detected from the first driving electrodes 106. A number of second resistor-capacitor values $R_{21}C, R_{22}C, \ldots, R_{2n}C$ can be detected from the second driving electrodes 108. A first coordinate of the touch spot T of the touch panel 10 along the first impedance direction H can be determined according to the first resistor-capacitor values $R_{11}C, R_{12}C, \ldots, R_{1n}C$ and the second resistor-capacitor values $R_{21}C, R_{22}C, \ldots, R_{2n}C$. A second coordinate of the touch spot T of the touch panel 10 along the second impedance direction D can be determined by respectively comparing the first resistor-capacitor values $R_{11}C, R_{12}C, \ldots, R_{1n}C$ to the second resistor-capacitor values $R_{21}C, R_{22}C, \ldots, R_{2n}C$. Thus, a location of the touch spot T of the touch panel 10 can be determined according to the first coordinate and the second coordinate.

The substrate 102 can be formed using transparent material, such as polyethylene (PE), polycarbonate (PC), polyethylene terephthalate (PET), polymethyl methacrylate (PMMA), glass, or quartz.

The conductive film 104 is formed by a drawn carbon nanotube film which can be pulled/drawn from a carbon nanotube array. The drawn carbon nanotube film includes a number of successive and oriented carbon nanotubes joined end-to-end by van der Waals force therebetween. The drawn carbon nanotube film is a freestanding film, meaning that the drawn carbon nanotube film does not need to be supported by a substrate and can sustain the weight of itself when it is hoisted by a portion thereof without tearing. The drawn carbon nanotube film has minimum impedance along the stretching direction of the successive and oriented carbon nanotubes and maximum impedance along the direction perpendicular to the stretching direction of the successive and oriented carbon nanotubes so as to have anisotropic impedance. In one embodiment, the first impedance direction H is the direction substantially perpendicular to the stretching direction of the successive and oriented carbon nanotubes. The second impedance direction D is substantially the stretching direction of the successive and oriented carbon nanotubes.

The first driving electrodes 106 and the second driving electrodes 108 can be formed using conductive material, such as metal, conductive polymer, conductive sizing, conductive glue, metallic carbon nanotubes, or indium tin oxide. The regular interval between two adjacent first driving electrodes 106 is in a range from about 3 millimeters to about 5 millimeters. Similarly, the regular interval between two adjacent second driving electrodes 108 is also in a range from about 3 millimeters to about 5 millimeters. A length of each of the first driving electrodes 106 and the second driving electrodes 108 substantially parallel to the first impedance direction H is in a range from about 1 millimeter to about 5 millimeters. A line between the first driving electrode 106 and the second driving electrode 108 of each of the electrode pairs 100 is substantially parallel to the second impedance direction D. In one embodiment, there are six first driving electrodes 106 disposed at the first side 111 of the conductive film 104, and six second driving electrodes 108 disposed at the second side 112 of the conductive film 104. The length of each of the first driving electrodes 106 and the second driving electrodes 108 is about 1 millimeter. The regular interval between two adjacent first driving electrodes 106 is about 3 millimeters, and the regular interval between two adjacent second driving electrodes 108 is about 3 millimeters.

The transparent cover layer 110 can be formed using transparent material, such as silicon nitride, silicon oxide, benzocyclobutene (BCB), polyester, or acrylic resin. Furthermore, the transparent cover layer 110 can be formed using a plastic film with surface hardening treatment, such as polyethylene terephthalate (PET) film, for protecting the conductive film 104.

Figure 4:
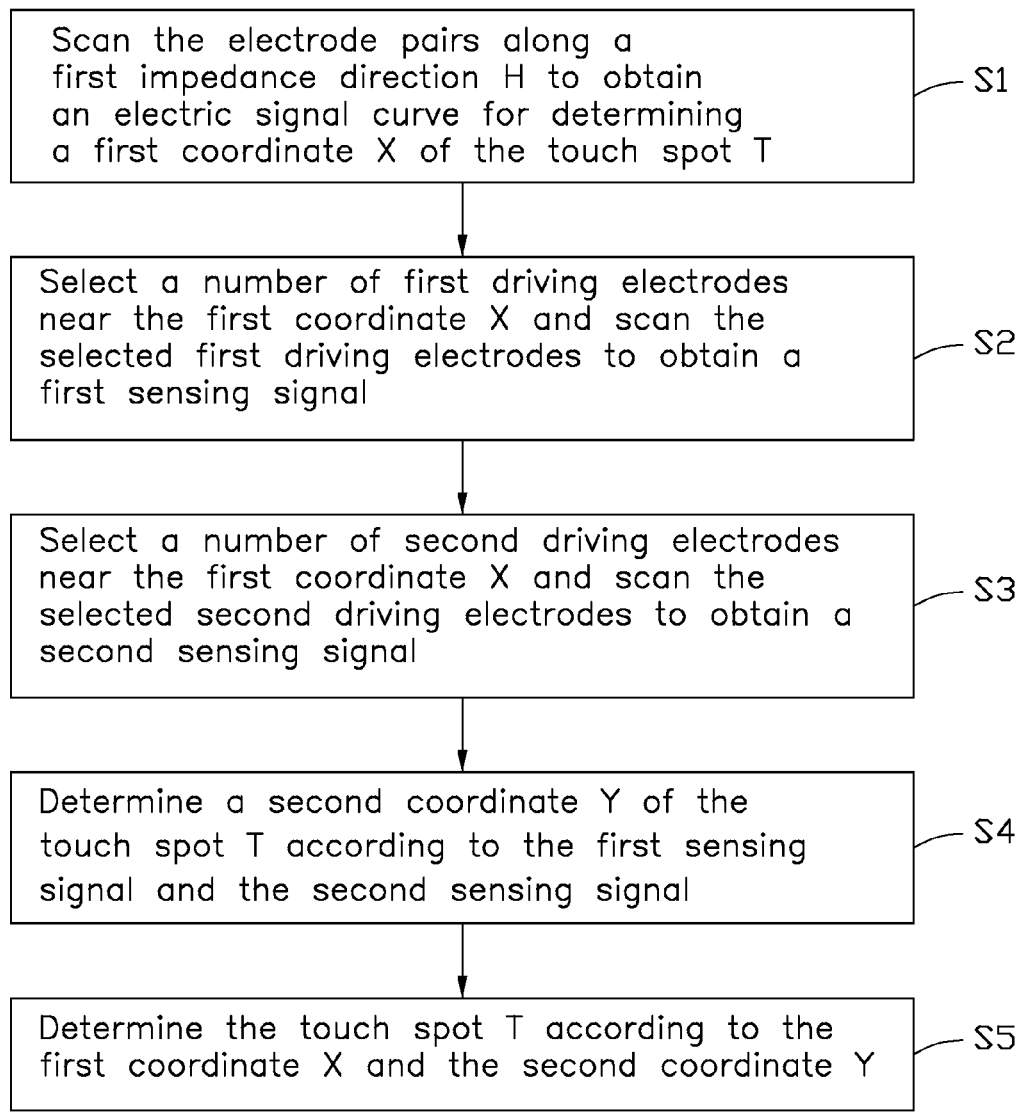
FIG. 4 is a flow chart of one embodiment of a method for detecting a touch spot of a touch panel.

Referring to FIG. 4, one embodiment of a method for forming a carbon nanotube composite includes:

(S1), scanning the electrode pairs 100 along the first impedance direction H with maximum impedance to obtain an electrical signal curve for determining a first coordinate X of the touch spot T;

(S2), selecting a number of first driving electrodes 106 near the first coordinate X and scanning the selected first driving electrodes 106 to obtain a first sensing signal;

(S3), selecting a number of second driving electrodes 108 near the first coordinate X and scanning the selected second driving electrodes 108 to obtain a second sensing signal;

(S4), determining a second coordinate Y of the touch spot T according to the first sensing signal and the second sensing signal; and (S5), determining the touch spot T according to the first coordinate X and the second coordinate Y.

In the step (S1), a method of scanning the electrode pairs 100 includes:

(S11), inputting a pulse signal into each of the electrode pairs 100 via the driving circuit 120; and (S12), detecting a number of sensing signals from the electrode pairs 100 via the sensing circuit 130 to obtain an electrical signal curve for determining the first coordinate X of the touch spot T.

Figure 5:
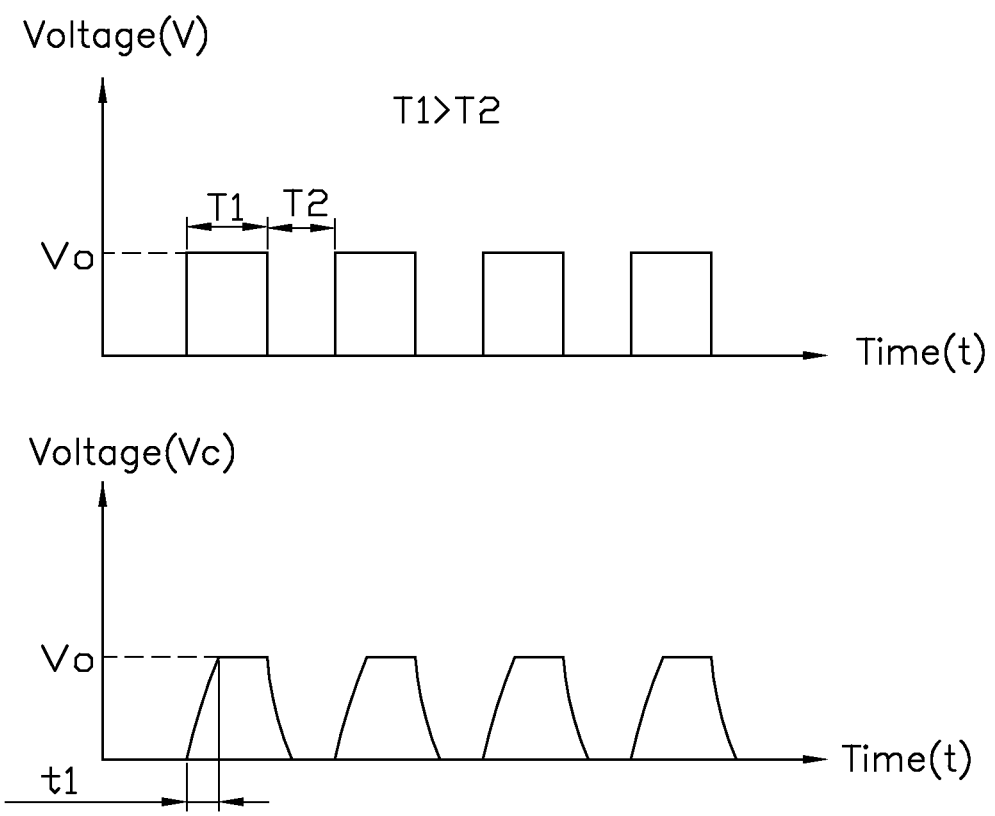
FIG. 5 is a waveform chart of voltage-time curves of inputting pulse signals into the touch panel shown in FIG. 1.

In the step (S11), the first driving electrode 106 and the second electrode 108 in the each of the plurality of electrode pairs 100 are simultaneously scanned. The input of the pulse signal is controlled by the first switch 124 and the second switch 136. In detail, the first switch 124 opens when the second switch 136 closes. The first switch 124 closes when the second switch 136 opens. Thus, the pulse signal is formed. Referring to FIG. 5, V represents a voltage inputted into the conductive film 104. Vc represents a voltage of the coupled capacitance 114. A period of closing the first switch 124 is $T_1$. A period of closing the second switch 136 is $T_2$. In detail, the first switch 124 closes and the second switch 136 opens during $T_1$. The second switch 136 closes and the first switch 124 opens during $T_2$. In one embodiment, the period $T_1$ is greater than the period $T_2$.

When the first switch 124 closes at the period $T_1$, the charge circuit 122 inputs a voltage $V_0$ into the conductive film 104 via one of the electrode pairs 100 to charge the coupled capacitance 114. When the second switch 136 closes at the period $T_2$, the storage circuit 1320 discharges the coupled capacitance 114, and the voltage of the storage circuit 1320 is changed. During a period $t_1$, the voltage Vc of the coupled capacitance 114 is gradually increased to the voltage $V_0$. After the period $t_1$, the voltage Vc of the coupled capacitance 114 is equal to the voltage $V_0$.

In the step (S12), each of the sensing signals is a product of the resistance value $R_n$ (n is 1, 2, 3, ..., n) and the capacitance value C. Thus, the sensing circuit 130 detects a number of resistor-capacitor values $R_0C$ from the electrode pairs 100. The electrical signal curve is a resistor-capacitor signal curve formed by the resistor-capacitor values $R_nC$. A relationship between Vc, $V_0$, and $R_nC$ satisfies an equation $$V_C = V_0 \times \left(1 - e^{\frac{t}{R_nC}}\right).$$

In the equation, t is a period of voltage of the coupled capacitance 114 rising from about zero to about the voltage Vc at a specific time point of the period $t_1$.

The electrode pair 100 can be formed by one first driving electrode 106 and one second driving electrode 108, one first driving electrode 106 and two second driving electrodes 108, or two first driving electrodes 106 and one second driving electrode 108. In one embodiment, each of the electrode pairs 100 is formed by one first driving electrode 106 and one second driving electrode 108.

Figure 6:
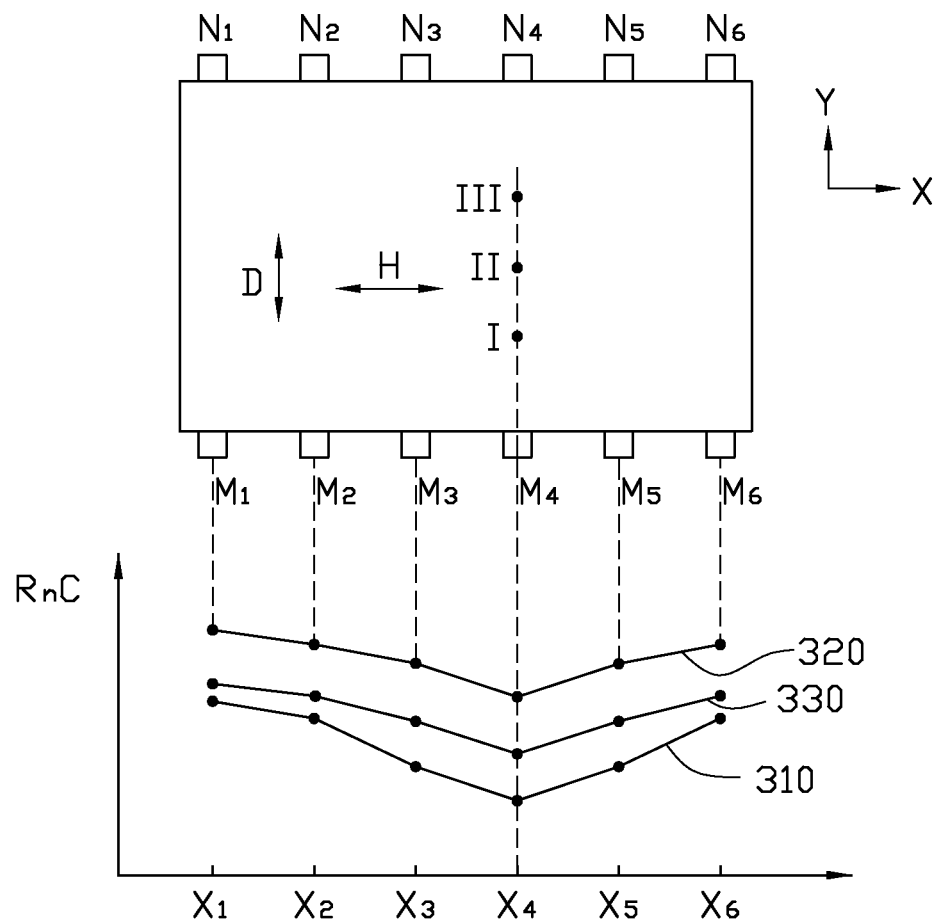
FIG. 6 is a waveform chart of electrical signal curves of separately scanning touch spots I-III of the touch panel shown in FIG. 1.

Referring to FIG. 6, one embodiment of scanning the electrode pairs 100 along the first impedance direction H to obtain an electrical signal curve 310 for determining a first coordinate of the single touch spot I is described below.

The first driving electrodes 106 are labeled as $M_1$, $M_2$, $M_3$, $M_4$, $M_5$, and $M_6$. The second driving electrodes 108 are labeled as $N_1$, $N_2$, $N_3$, $N_4$, $N_5$, and $N_6$. There are a number of coordinates $X_1$, $X_2$, $X_3$, $X_4$, $X_5$, and $X_6$ representing six coordinates of the first driving electrodes 106, six coordinates of the second driving electrodes 108, or six coordinates of the electrode pairs 100 along the first impedance direction H. Thus, the sensing circuit 130 detects six resistor-capacitor values $R_1C$, $R_2C$, $R_3C$, $R_4C$, $R_5C$, and $R_6C$ from the electrode pairs 100. In detail, the resistor-capacitor values $R_1C$ is detected by $M_1$ and $N_1$, the resistor-capacitor values $R_2C$ is detected by $M_2$ and $N_2$, the resistor-capacitor values $R_3C$ is detected by $M_3$ and $N_3$, the resistor-capacitor values $R_4C$ is detected by $M_4$ and $N_4$, the resistor-capacitor values $R_5C$ is detected by $M_5$ and $N_5$, and the resistor-capacitor values $R_6C$ is detected by $M_6$ and $N_6$.

As shown in FIG. 6, the single touch spot I is located at a line between $M_4$ and $N_4$. The electrical signal curve 310 is a resistor-capacitor signal curve 310 formed by the resistor-capacitor values $R_1C$, $R_2C$, $R_3C$, $R_4C$, $R_5C$, and $R_6C$ when the conductive subject is near or touches the touch panel 10 at the single touch spot I. The resistor-capacitor value $R_4C$ is the smallest resistor-capacitor value at the resistor-capacitor signal curve 310 because the single touch spot I is at a line between $M_4$ and $N_4$. In other words, the resistor-capacitor value $R_4C$ is a wave trough of the resistor-capacitor signal curve 310. In detail, the resistor-capacitor values $R_3C$ and $R_5C$ adjacent to the resistor-capacitor value $R_4C$ are equal to each other and are greater than the resistor-capacitor value $R_4C$. Thus, the first coordinate of the single touch spot I is the coordinate $X_4$.

Furthermore, the first coordinate of the single touch spot I can be determined according to the electrical signal curve 310 by an interpolation method. In detail, the first coordinate of the single touch spot I can be determined by a formula $$\frac{X_3\Delta R_3C + X_5\Delta R_5C}{\Delta R_3C + \Delta R_5C},$$

a formula $$\frac{X_3\Delta R_3C + X_4\Delta R_4C + X_5\Delta R_5C}{\Delta R_3C + \Delta R_4C + \Delta R_5C},$$

or a formula $$\frac{X_1\Delta R_1C + X_2\Delta R_2C + X_3\Delta R_3C + X_4\Delta R_4C + X_5\Delta R_5C + X_6\Delta R_6C}{\Delta R_1C + \Delta R_2C + \Delta R_3C + \Delta R_4C + \Delta R_5C + \Delta R_6C}.$$

In the formulas, $\Delta R_nC$ satisfies a formula $R_kC - R_nC$ (n is 1, 2, 3, ..., 6), wherein $R_kC$ is the greatest resistor-capacitor value of the resistor-capacitor signal curve 310. As shown in FIG. 6, the greatest resistor-capacitor value of the resistor-capacitor signal curve 310 is the resistor-capacitor value $R_1C$. In one embodiment, the first coordinate of the single touch spot I is determined by the formula $$\frac{X_3\Delta R_3C + X_5\Delta R_5C}{\Delta R_3C + \Delta R_5C}.$$

Referring to FIG. 6, one embodiment of scanning the electrode pairs 100 along the first impedance direction H with maximum impedance to obtain an electrical signal curve 330 for determining a first coordinate of the single touch spot II is described below.

As shown in FIG. 6, the single touch spot II is located at the line between $M_4$ and $N_4$. The electrical signal curve 330 is a resistor-capacitor signal curve 310 formed by the resistor-capacitor values $R_1C$, $R_2C$, $R_3C$, $R_4C$, $R_5C$, and $R_6C$ when the conductive subject is near or touches the touch panel 10 at the single touch spot II. The resistor-capacitor value $R_4C$ is the smallest resistor-capacitor value at the resistor-capacitor signal curve 330 because the single touch spot II is at the line between $M_4$ and $N_4$. In other words, the resistor-capacitor value $R_4C$ is a wave trough of the resistor-capacitor signal curve 330. In detail, the resistor-capacitor values $R_3C$ and $R_5C$ adjacent to the resistor-capacitor value $R_4C$ are equal to each other and are greater than the resistor-capacitor value $R_4C$. Thus, the first coordinate of the single touch spot II is the coordinate $X_4$.

Furthermore, the first coordinate of the single touch spot II can be determined according to the electrical signal curve 330 by an interpolation method. In detail, the first coordinate of the single touch spot II can be determined by a formula $$\frac{X_3\Delta R_3C + X_5\Delta R_5C}{\Delta R_3C + \Delta R_5C},$$

a formula $$\frac{X_3\Delta R_3C + X_4\Delta R_4C + X_5\Delta R_5C}{\Delta R_3C + \Delta R_4C + \Delta R_5C},$$

or a formula $$\frac{X_1\Delta R_1C + X_2\Delta R_2C + X_3\Delta R_3C + X_4\Delta R_4C + X_5\Delta R_5C + X_6\Delta R_6C}{\Delta R_1C + \Delta R_2C + \Delta R_3C + \Delta R_4C + \Delta R_5C + \Delta R_6C}.$$

In the formulas, $\Delta R_nC$ satisfies a formula $R_kC - R_nC$ (n is 1, 2, 3, ..., 6), wherein $R_kC$ is the greatest resistor-capacitor value of the resistor-capacitor signal curve 330. As shown in FIG. 6, the greatest resistor-capacitor value of the resistor-capacitor signal curve 330 is the resistor-capacitor value $R_1C$. In one embodiment, the first coordinate of the single touch spot II is determined by the formula $$\frac{X_3\Delta R_3C + X_5\Delta R_5C}{\Delta R_3C + \Delta R_5C}.$$

Referring to FIG. 6, one embodiment of scanning the electrode pairs 100 along the first impedance direction H with maximum impedance to obtain an electrical signal curve 320 for determining a first coordinate of the single touch spot III is described below.

As shown in FIG. 6, the single touch spot III is located at the line between $M_4$ and $N_4$. The electrical signal curve 320 is a resistor-capacitor signal curve 320 formed by the resistor-capacitor values $R_1C$, $R_2C$, $R_3C$, $R_4C$, $R_5C$, and $R_6C$ when the conductive subject is near or touches the touch panel 10 at the single touch spot III. The resistor-capacitor value $R_4C$ is the smallest resistor-capacitor value at the resistor-capacitor signal curve 320 because the single touch spot III is at the line between $M_4$ and $N_4$. In other words, the resistor-capacitor value $R_4C$ is a wave trough of the resistor-capacitor signal curve 320. In detail, the resistor-capacitor values $R_3C$ and $R_5C$ adjacent to the resistor-capacitor value $R_4C$ are equal to each other and are greater than the resistor-capacitor value $R_4C$. Thus, the first coordinate of the single touch spot III is the coordinate $X_4$.

Furthermore, the first coordinate of the single touch spot III can be determined according to the electrical signal curve 320 by an interpolation method. In detail, the first coordinate of the single touch spot III can be determined by a formula $$\frac{X_3\Delta R_3C + X_5\Delta R_5C}{\Delta R_3C + \Delta R_5C},$$

a formula $$\frac{X_3\Delta R_3C + X_4\Delta R_4C + X_5\Delta R_5C}{\Delta R_3C + \Delta R_4C + \Delta R_5C},$$

or a formula $$\frac{X_1\Delta R_1C + X_2\Delta R_2C + X_3\Delta R_3C + X_4\Delta R_4C + X_5\Delta R_5C + X_6\Delta R_6C}{\Delta R_1C + \Delta R_2C + \Delta R_3C + \Delta R_4C + \Delta R_5C + \Delta R_6C}.$$

In the formulas, $\Delta R_nC$ satisfies a formula $R_kC - R_nC$ (n is 1, 2, 3, ..., 6), wherein $R_kC$ is the greatest resistor-capacitor value of the resistor-capacitor signal curve 320. As shown in FIG. 6, the greatest resistor-capacitor value of the resistor-capacitor signal curve 320 is the resistor-capacitor value $R_1C$. In one embodiment, the first coordinate of the single touch spot III is determined by the formula $$\frac{X_3\Delta R_3C + X_5\Delta R_5C}{\Delta R_3C + \Delta R_5C}.$$

Figure 7:
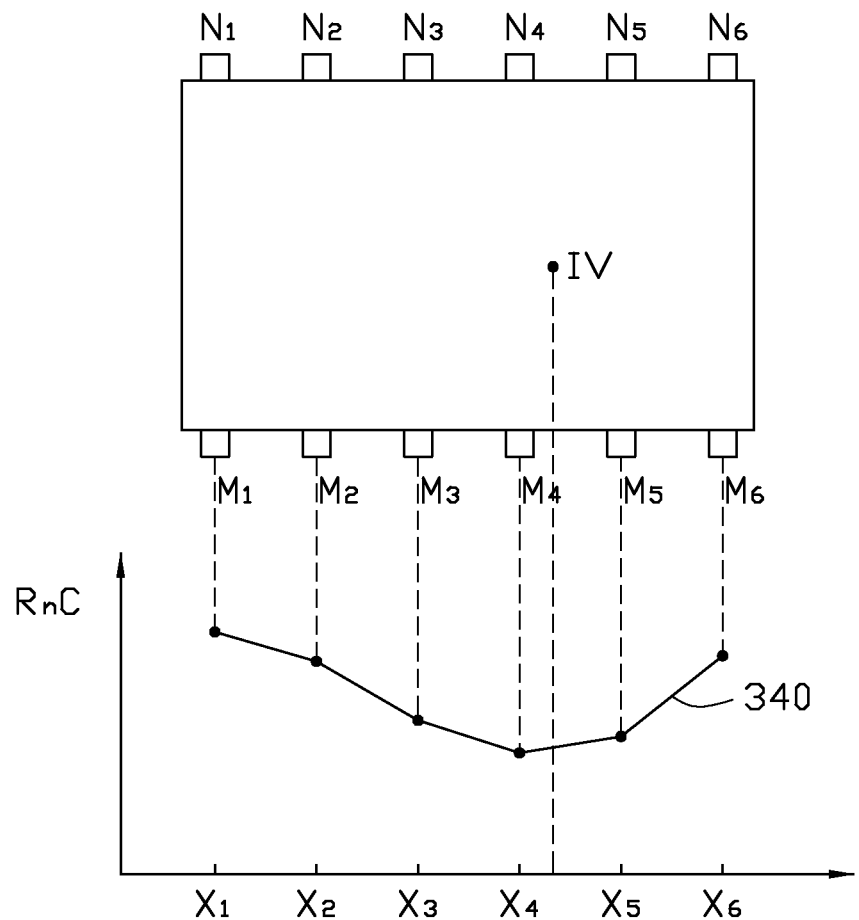
FIG. 7 is a waveform chart of an electrical signal curve of scanning a touch spot IV of the touch panel shown in FIG. 1.

Referring to FIG. 7, one embodiment of scanning the electrode pairs 100 along the first impedance direction H with maximum impedance to obtain an electrical signal curve 340 for determining a first coordinate of the single touch spot IV is described below.

As shown in FIG. 7, the single touch spot IV is located in an area defined by the line between $M_4$ and $N_4$ and a line between $M_5$ and $N_5$. Furthermore, the single touch spot IV is closer to the line between $M_4$ and $N_4$. The electrical signal curve 340 is a resistor-capacitor signal curve 340 formed by the resistor-capacitor values $R_1C$, $R_2C$, $R_3C$, $R_4C$, $R_5C$, and $R_6C$ when the conductive subject is near or touches the touch panel 10 at the single touch spot IV. The resistor-capacitor value $R_4C$ is the smallest resistor-capacitor value at the resistor-capacitor signal curve 340 because the single touch spot IV is closer to the line between $M_4$ or $N_4$. In other words, the resistor-capacitor value $R_4C$ is a wave trough of the resistor-capacitor signal curve 340. In detail, the resistor-capacitor value $R_5C$ adjacent to the resistor-capacitor value $R_4C$ is greater than the resistor-capacitor value $R_4C$. The resistor-capacitor value $R_3C$ is greater than the resistor-capacitor value $R_5C$. The resistor-capacitor values $R_1C$, $R_2C$, and $R_6C$ are greater than the resistor-capacitor value $R_3C$. Thus, the first coordinate of the single touch spot IV is the coordinate closer to $X_4$.

Furthermore, the first coordinate of the single touch spot IV can be determined according to the electrical signal curve 340 by an interpolation method. In detail, the first coordinate of the single touch spot IV can be determined by a formula $$\frac{X_4\Delta R_4C + X_5\Delta R_5C}{\Delta R_4C + \Delta R_5C},$$

a formula $$\frac{X_3\Delta R_3C + X_4\Delta R_4C + X_5\Delta R_5C}{\Delta R_3C + \Delta R_4C + \Delta R_5C},$$

or a formula $$\frac{X_1\Delta R_1C + X_2\Delta R_2C + X_3\Delta R_3C + X_4\Delta R_4C + X_5\Delta R_5C + X_6\Delta R_6C}{\Delta R_1C + \Delta R_2C + \Delta R_3C + \Delta R_4C + \Delta R_5C + \Delta R_6C}.$$

In the formulas, $\Delta R_nC$ satisfies a formula $R_kC - R_nC$ (n is 1, 2, 3, ..., 6), wherein $R_kC$ is the greatest resistor-capacitor value of the resistor-capacitor signal curve 340. As shown in FIG. 7, the greatest resistor-capacitor value of the resistor-capacitor signal curve 340 is the resistor-capacitor value $R_1C$. In one embodiment, the first coordinate of the single touch spot IV is determined by the formula $$\frac{X_3 \Delta R_3 C + X_4 \Delta R_4 C + X_5 \Delta R_5 C}{\Delta R_3 C + \Delta R_4 C + \Delta R_5 C}.$$

Figure 8:
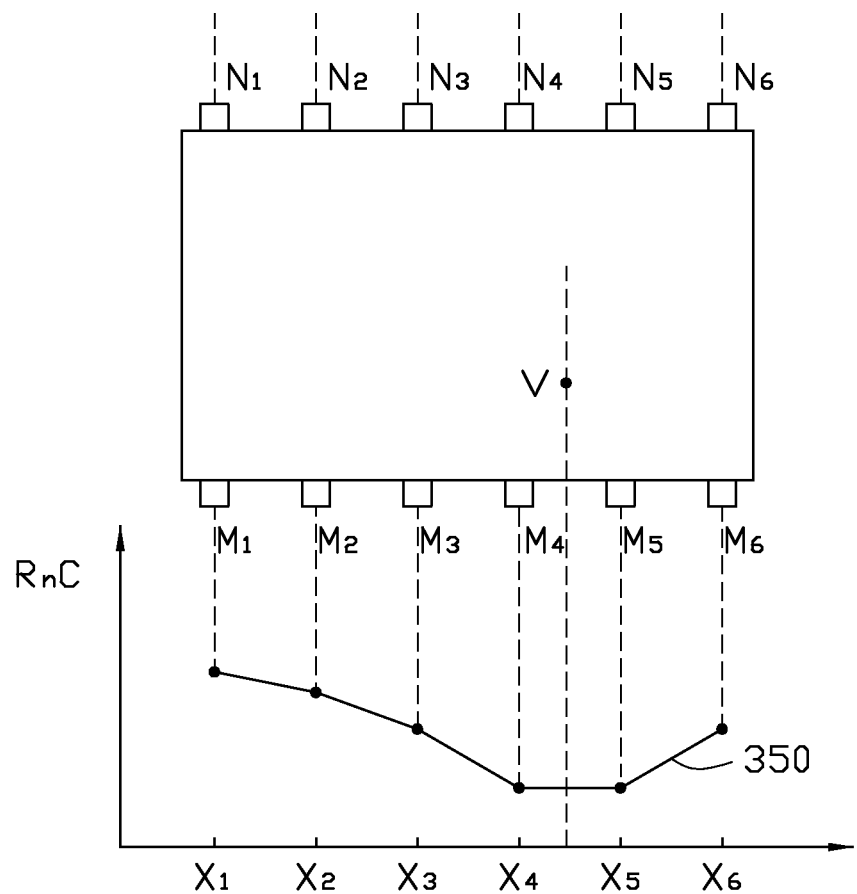
FIG. 8 is a waveform chart of an electrical signal curve of scanning a touch spot V of the touch panel shown in FIG. 1.

Referring to FIG. 8, one embodiment of scanning the electrode pairs 100 along the first impedance direction H with maximum impedance to obtain an electrical signal curve 350 for determining a first coordinate of the single touch spot V is described below.

As shown in FIG. 8, the single touch spot V is located in the area defined by the line between $M_4$ and $N_4$ and a line between $M_5$ and $N_5$. Furthermore, the single touch spot V is located about equidistant from the line between $M_4$ and $N_4$ and the line between $M_5$ and $N_5$. The electrical signal curve 350 is a resistor-capacitor signal curve 350 formed by the resistor-capacitor values $R_1C$, $R_2C$, $R_3C$, $R_4C$, $R_5C$, and $R_6C$ when the conductive subject is near or touches the touch panel 10 at the single touch spot V. The resistor-capacitor values $R_4C$ and $R_5C$ are the smallest resistor-capacitor values at the resistor-capacitor signal curve 350 and about equal to each other because the single touch spot V is located almost exactly between the line between $M_4$ and $N_4$ and the line between $M_5$ and $N_5$. In detail, the resistor-capacitor values $R_3C$ and $R_6C$ respectively adjacent to the resistor-capacitor values $R_4C$ and $R_5C$ are equal to each other and greater than the resistor-capacitor values $R_4C$ and $R_5C$. Thus, the first coordinate of the single touch spot V is a coordinate located in the middle of $X_4$ and $X_5$.

Furthermore, the first coordinate of the single touch spot V can be determined according to the electrical signal curve 350 by an interpolation method. In detail, the first coordinate of the single touch spot V can be determined by a formula $$\frac{X_4 \Delta R_4 C + X_5 \Delta R_5 C}{\Delta R_4 C + \Delta R_5 C},$$

a formula $$\frac{X_3 \Delta R_3 C + X_4 \Delta R_4 C + X_5 \Delta R_5 C}{\Delta R_3 C + \Delta R_4 C + \Delta R_5 C},$$

a formula $$\frac{X_4 \Delta R_4 C + X_5 \Delta R_5 C + X_6 \Delta R_6 C}{\Delta R_4 C + \Delta R_5 C + \Delta R_6 C},$$

or a formula $$\frac{X_1 \Delta R_1 C + X_2 \Delta R_2 C + X_3 \Delta R_3 C + X_4 \Delta R_4 C + X_5 \Delta R_5 C + X_6 \Delta R_6 C}{\Delta R_1 C + \Delta R_2 C + \Delta R_3 C + \Delta R_4 C + \Delta R_5 C + \Delta R_6 C}.$$

In the formulas, $\Delta R_n C$ satisfies a formula $R_k C - R_n C$ (n is 1, 2, 3, ..., 6), wherein $R_k C$ is the greatest resistor-capacitor value of the resistor-capacitor signal curve 340. As shown in FIG. 8, the greatest resistor-capacitor value of the resistor-capacitor signal curve 350 is the resistor-capacitor value $R_1C$.

Accordingly, one embodiment of a method for determining a first coordinate of a single touch spot along the first impedance direction H with maximum impedance according to an electrical signal curve includes:

(a), detecting the electrical signal curve, such as the resistor-capacitor signal curve formed by the resistor-capacitor values $R_n C$ (n is 1, 2, 3, ..., 6) detected from the electrode pairs 100 to obtain the greatest resistor-capacitor value $R_k C$ of the resistor-capacitor signal curve; and (b), detecting a smallest resistor-capacitor value $R_x C$ and a second small resistor-capacitor value $R_y C$ at the resistor-capacitor signal curve to determine the first coordinate of the single touch spot by an interpolation method.

More specifically, when the smallest resistor-capacitor value $R_x C$ is equal to the second small resistor-capacitor value $R_y C$, the first coordinate of the single touch spot can be determined by a formula $$\frac{X_x \Delta R_X C + X_y \Delta R_y C}{\Delta R_X C + \Delta R_y C}.$$

In the formula, $\Delta R_x C$ satisfies a formula $R_k C - R_x C$, and $\Delta R_y C$ satisfies a formula $R_k C - R_y C$.

In addition, when the smallest resistor-capacitor value $R_x C$ is different from the second small resistor-capacitor value $R_y C$, a third small resistor-capacitor value $R_z C$ is further detected at the resistor-capacitor signal curve. If the second small resistor-capacitor value $R_y C$ is equal to the third small resistor-capacitor value $R_z C$, the first coordinate of the single touch spot can be determined by a formula $$\frac{X_Z \Delta R_Z C + X_y \Delta R_y C}{\Delta R_Z C + \Delta R_y C}.$$

In the formula, $\Delta R_z C$ satisfies a formula $R_k C - R_z C$.

In one embodiment, the first coordinate of the single touch spot can be determined by detecting three smaller resistor-capacitor values $R_x C$, $R_y C$, and $R_z C$ at the resistor-capacitor signal curve. Any two of the resistor-capacitor values $R_x$, $R_y C$, and $R_z C$ can be equal. In detail, the first coordinate of the single touch spot can be determined by a formula $$\frac{X_X \Delta R_X C + X_y \Delta R_y C + X_Z \Delta R_Z C}{\Delta R_X C + \Delta R_y C + \Delta R_Z C}.$$

In another embodiment, the first coordinate of the single touch spot can be determined by detecting all of the smaller resistor-capacitor values $R_1 C$, $R_2 C$, ..., $R_n C$ at the resistor-capacitor signal curve. In detail, the first coordinate of the single touch spot can be determined by a formula $$\frac{\sum_{n=1}^{E} X_n \Delta R_n C}{\sum_{n=1}^{E} \Delta R_n C}.$$

In the formula, E is a total number of the electrode pairs 100.

Figure 9:
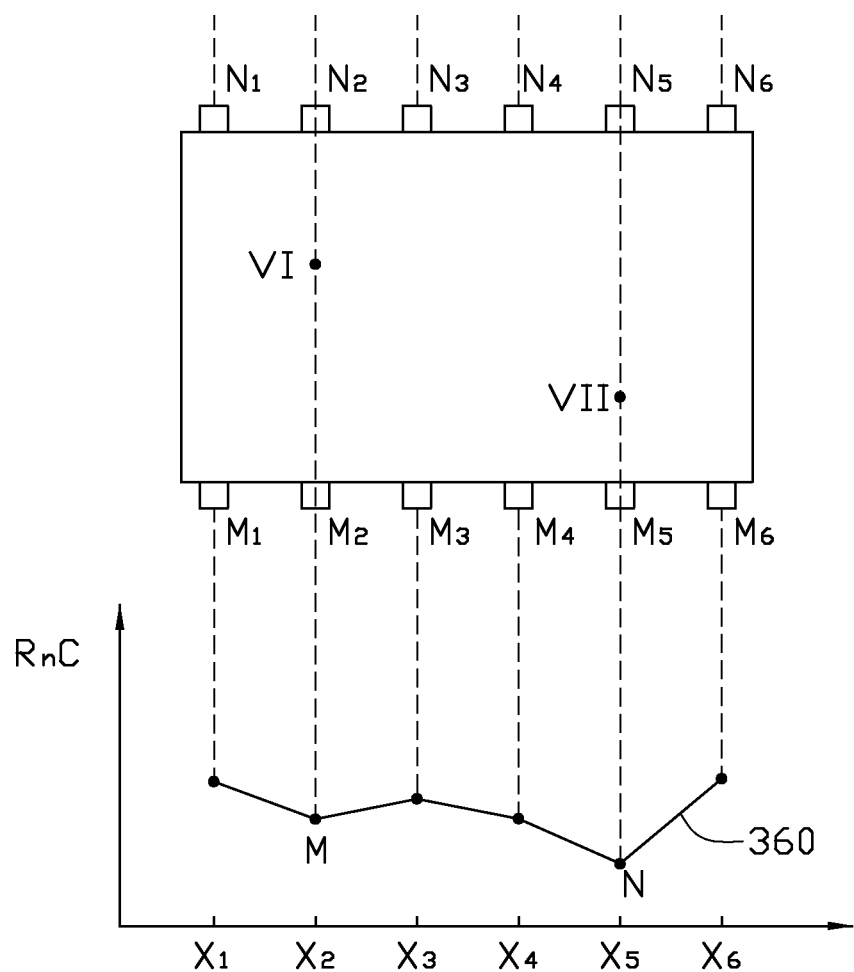
FIG. 9 is a waveform chart of electrical signal curves of simultaneously scanning touch spots VI and VII of the touch panel shown in FIG. 1.

Referring to FIG. 9, one embodiment of scanning the electrode pairs 100 along the first impedance direction H with maximum impedance to obtain an electrical signal curve 360 for determining first coordinates of single touch spots VI and VII is described below.

As shown in FIG. 9, the electrical signal curve 360 is a resistor-capacitor signal curve 360 formed by the resistor-capacitor values R₁C, R₂C, R₃C, R₄C, R₅C, and R₆C when the conductive subjects are near or touch the touch panel 10 at the touch spots VI and VII. The resistor-capacitor values R₂C and R₅C are wave troughs of the resistor-capacitor signal curve 360. In detail, the touch spot VI is at a line between M₂ and N₂, and the touch spot VII is at a line between M₅ and N₅. The resistor-capacitor values R₁C and R₃C adjacent to the resistor-capacitor value R₂C are greater than the resistor-capacitor value R₄C. The resistor-capacitor values R₄C and R₆C adjacent to the resistor-capacitor value R₅C are greater than the resistor-capacitor value R₅C. Thus, the first coordinate of the touch spots VI and VII are respectively the coordinates X₂ and X₅.

Furthermore, the first coordinate of the touch spot VI can be determined according to the electrical signal curve 360 by an interpolation method. In detail, the first coordinate of the touch spot VI can be determined by a formula $$\frac{X_1 \Delta R_1 C + X_2 \Delta R_2 C + X_3 \Delta R_3 C}{\Delta R_1 C + \Delta R_2 C + \Delta R_3 C}.$$

The first coordinate of the touch spot VII can be determined according to the electrical signal curve 360 by an interpolation method. In detail, the first coordinate of the touch spot VII can be determined by a formula $$\frac{X_4 \Delta R_4 C + X_5 \Delta R_5 C + X_6 \Delta R_6 C}{\Delta R_4 C + \Delta R_5 C + \Delta R_6 C}.$$

Accordingly, one embodiment of a method for determining first coordinates of touch spots along the first impedance direction H with maximum impedance according to an electrical signal curve includes:

(a), detecting the electrical signal curve, such as the resistor-capacitor signal curve formed by the resistor-capacitor values $R_nC$ (n is 1, 2, 3, ..., 6) detected from the electrode pairs 100;

(b), detecting a number of resistor-capacitor values $R_{X1}C$, $R_{X2}C$, ..., $R_{Xm}C$ respectively representing a number of wave troughs at the resistor-capacitor signal curve, and detecting a number of resistor-capacitor values $R_{y1}C$, $R_{y2}C$, ..., $R_{ym}C$ adjacent to each of the resistor-capacitor values respectively representing the wave troughs; and (c), determining the first coordinates of the touch spots by an interpolation method according to the resistor-capacitor values $R_{Xm}C$ and $R_{ym}C$.

Figure 10:
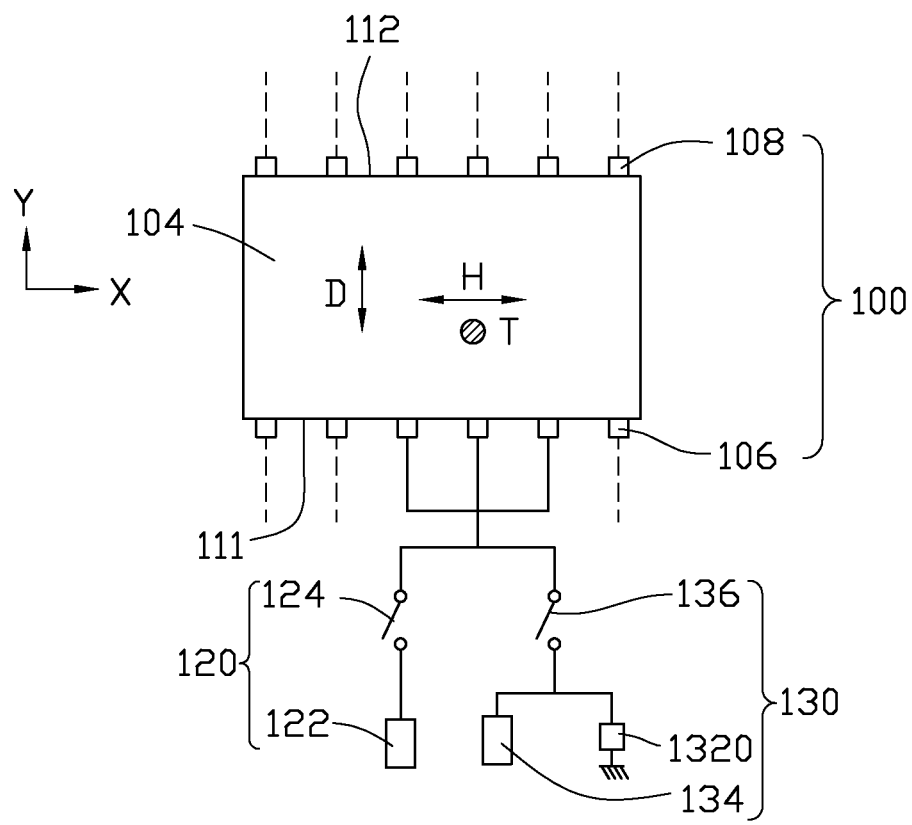
FIG. 10 is a schematic view of one embodiment of scanning a number of first driving electrodes of the touch panel shown in FIG. 1.

Referring to FIG. 10, a method of scanning the selected first driving electrodes 106 to obtain a first sensing signal of the step (S2) includes:

(S21), inputting a pulse signal into the selected first driving electrodes 106 simultaneously via the driving circuit 120; and (S22), detecting a first sensing signal from the selected first driving electrodes 106 via the sensing circuit 130.

In the step (S22), the touch spot T of the touch panel 10 and the selected first driving electrodes 106 form a resistance value $R_{1S}$. The first sensing signal is a product of the resistance value $R_{1S}$ and the capacitance value C. Thus, the sensing circuit 130 detects a resistor-capacitor value $R_{1S}C$ from the selected first driving electrodes 106.

Figure 11:
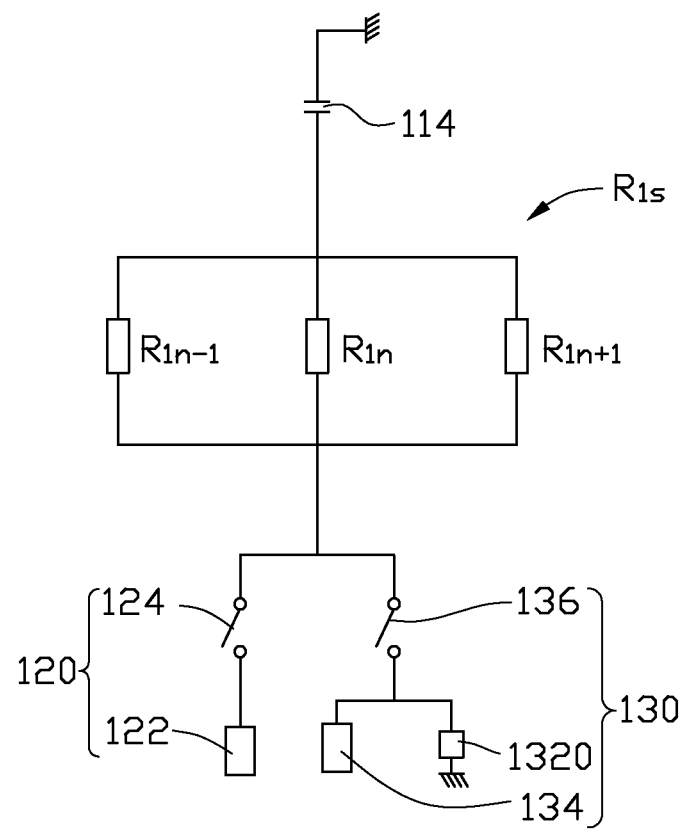
FIG. 11 is a circuit diagram of one embodiment of scanning the first driving electrodes of the touch panel shown in FIG. 1.

In one embodiment, the touch spot T of the touch panel 10 and three selected first driving electrodes 106 form a resistance value $R_{1S}$. Referring to FIG. 11, a relationship between $R_{1S}$, $R_{1n}$, $R_{1n+1}$, and $R_{1n-1}$ satisfies an equation $$\frac{1}{R_{1n-1}} + \frac{1}{R_{1n}} + \frac{1}{R_{1n+1}} = \frac{1}{R_{1S}}.$$

In the equation, $R_{1n}$, $R_{1n+1}$, and $R_{1n-1}$ respectively represent resistance values that are separately defined by the three selected first driving electrodes 106 and the touch spot T.

Figure 12:
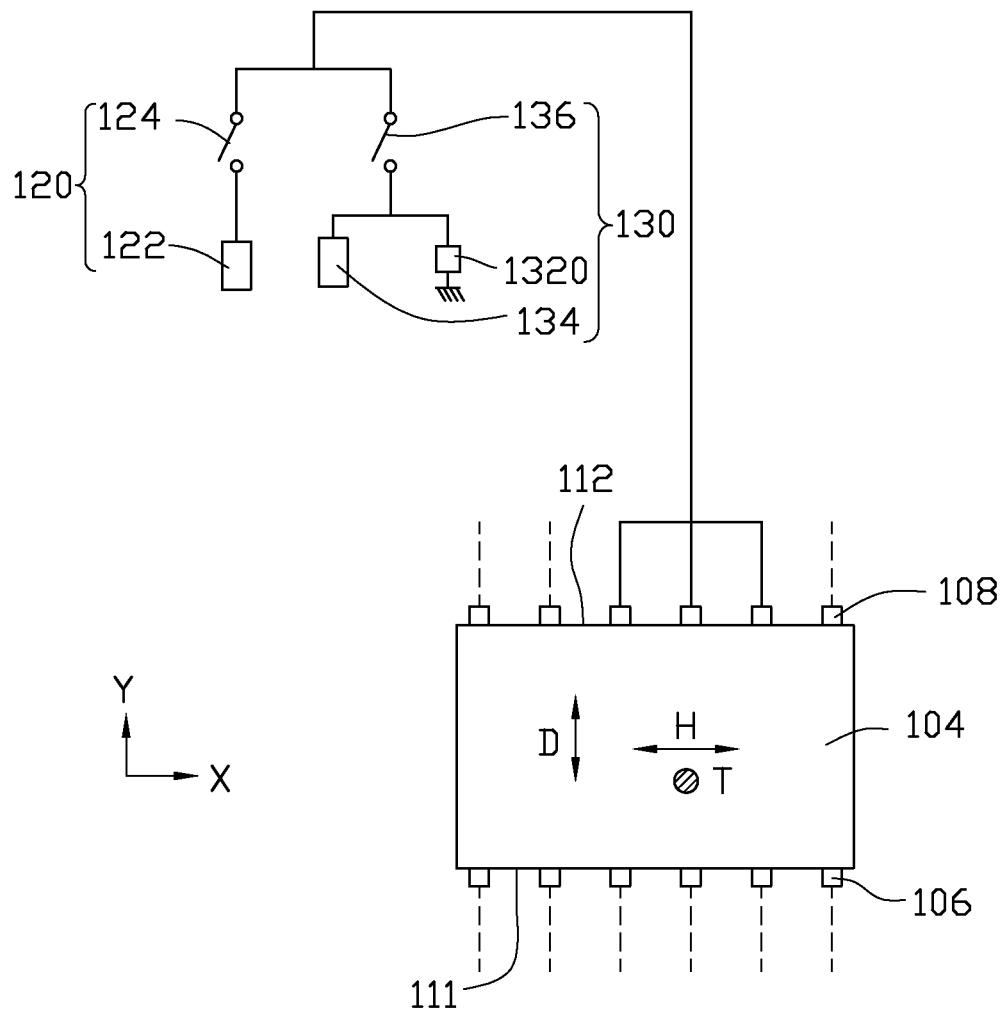
FIG. 12 is a schematic view of one embodiment of scanning a number of second driving electrodes of the touch panel shown in FIG. 1.

Referring to FIG. 12, a method of scanning the selected second driving electrodes 108 to obtain a second sensing signal of the step (S3) includes:

(S31), inputting a pulse signal into the selected second driving electrodes 108 simultaneously via the driving circuit 120; and (S32), detecting a second sensing signal from the selected second driving electrodes 108 via the sensing circuit 130.

In the step (S32), the touch spot T of the touch panel 10 and the selected second driving electrodes 108 form a resistance value $R_{2S}$. The second sensing signal is a product of the resistance value $R_{2S}$ and the capacitance value C. Thus, the sensing circuit 130 detects a resistor-capacitor value $R_{2S}C$ from the selected second driving electrodes 108.

Figure 13:
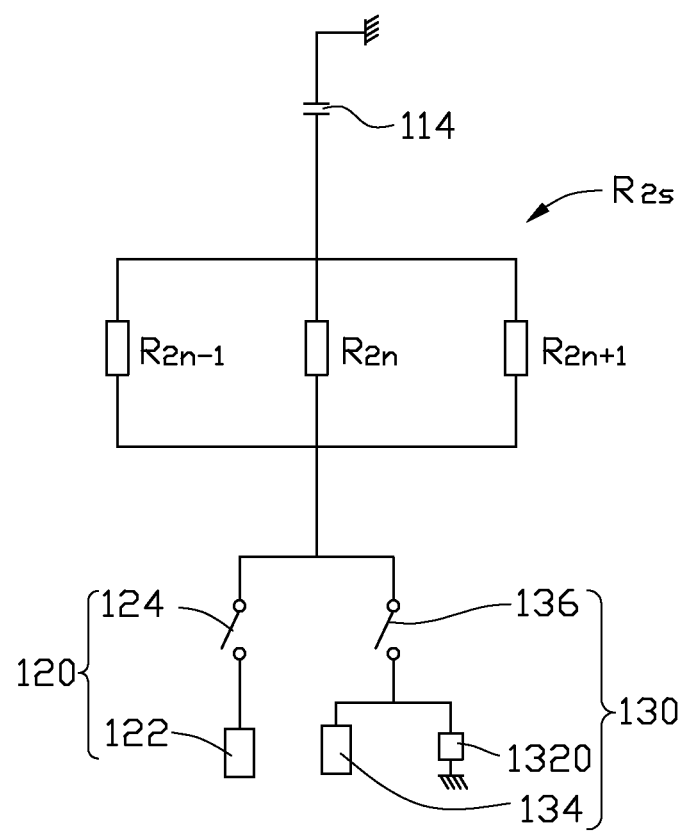
FIG. 13 is a circuit diagram of one embodiment of scanning the second driving electrodes of the touch panel shown in FIG. 1.

In one embodiment, the touch spot T of the touch panel 10 and three selected second driving electrodes 108 form a resistance value $R_{2S}$. Referring to FIG. 13, a relationship between $R_{2S}$, $R_{2n}$, $R_{2n+1}$, and $R_{2n-1}$ satisfies an equation $$\frac{1}{R_{2n-1}} + \frac{1}{R_{2n}} + \frac{1}{R_{2n+1}} = \frac{1}{R_{2S}}.$$

In the equation, $R_{2n}$, $R_{2n-1}$, and $R_{2n-1}$, respectively represent resistance values that are separately defined by the three selected second driving electrodes 108 and the touch spot T.

In the step (S4), the second coordinate Y of the touch spot T is determined by computing a ratio of the first sensing signal such as the resistor-capacitor value $R_{1S}C$, to the second sensing signal such as the resistor-capacitor value $R_{2S}C$. The ratio of the first sensing signal to the second sensing signal is proportional to a ratio of a distance between the second coordinate Y and the first side 111 to a distance between the second coordinate Y and the second side 112.

Accordingly, the present disclosure is capable of providing a method for detecting a touch spot of a touch panel, which can reduce the time of scanning driving electrodes of each of electrode pairs and improve the precision of detecting the touch spot.

Finally, it is to be understood that the above-described embodiments are intended to illustrate rather than limit the present disclosure. Variations may be made to the embodiments without departing from the spirit of the disclosure as claimed. Elements associated with any of the above embodiments are envisioned to be associated with any other embodiments. The above-described embodiments illustrate the scope of the disclosure but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A method for detecting a touch spot of a touch panel, the touch panel comprising a substrate, a plurality of first driving electrodes, a plurality of second driving electrodes, and a conductive film disposed on the substrate, the conductive film comprising a first side and a second side, and defining a first impedance direction and a second impedance direction substantially perpendicular to the first impedance direction, the first side and the second side being substantially parallel to the first impedance direction, the plurality of first driving electrodes being disposed at the first side with a regular interval and electrically connected to the conductive film, the plurality of second driving electrodes being disposed at the second side with a regular interval and electrically connected to the conductive film, the plurality of first driving electrodes are respectively aligned with the plurality of second driving electrodes to form a plurality of electrode pairs, the method comprising:

inputting a pulse signal into each of the plurality of electrode pairs via at least one driving circuit;

detecting a plurality of sensing signals from the plurality of electrode pairs via at least one sensing circuit to obtain an electrical signal curve, wherein the electrical signal curve is a resistor-capacitor signal curve comprising a plurality of resistor-capacitor values represented by $R_nC$;

determining a first coordinate according to the electrical signal curve by detecting a smallest resistor-capacitor value at the resistor-capacitor signal curve using:

a first formula $$\frac{X_X \Delta R_X C + X_y \Delta R_y C}{\Delta R_X C + \Delta R_y C},$$

wherein $\Delta R_X C = R_k C - R_X C$ and $\Delta R_y c = R_k C - R_y C$, when $R_x C$ is equal to $R_y C$;

a second formula $$\frac{X_Z \Delta R_Z C + X_y \Delta R_y C}{\Delta R_Z C + \Delta R_y C},$$

wherein $\Delta R_y C = R_k C - R_y C$ and $\Delta R_Z C = R_k C - R_Z C$, when $R_x C$ is different from $R_y C$, and $R_y C$ is equal to $R_Z C$;

a third formula $$\frac{X_X \Delta R_X C + X_y \Delta R_y C + X_Z \Delta R_Z C}{\Delta R_X C + \Delta R_y C + \Delta R_Z C},$$

wherein $\Delta R_X C = R_k C - R_X C$, $\Delta R_y C = R_k C - R_y C$, and $\Delta R_Z C = R_k C - R_Z C$; or a fourth formula $$\frac{\sum_{n=1}^{E} X_n \Delta R_n C}{\sum_{n=1}^{E} \Delta R_n C},$$

wherein $\Delta R_n C = R_k C - R_n C$, E is a total number of the plurality of electrode pairs, $R_X C$ is a smallest resistor-capacitor value, $R_y C$ is a second small resistor-capacitor value, $R_Z C$ is a third small resistor-capacitor value, and $R_k C$ is a greatest resistor-capacitor value of the resistor-capacitor signal curve;

selecting a part of the plurality of first driving electrodes near the first coordinate and inputting a pulse signal into the part of the plurality of first driving electrodes simultaneously via the at least one driving circuit;

detecting a first sensing signal from the part of the plurality of first driving electrodes via the at least one sensing circuit; wherein the first sensing signal is a product of a first resistance value multiplied by a first capacitance value, the first resistance value is a total resistance of a plurality of resistances parallel connected to each other, and the plurality resistances are resistances between the touch spot and each of the part of the plurality of first driving electrodes;

selecting a part of the plurality of second driving electrodes near the first coordinate and inputting a pulse signal into the part of the plurality of second driving electrodes simultaneously via the at least one driving circuit;

detecting a second sensing signal from the part of the plurality of second driving electrodes via the at least one sensing circuit; wherein the second sensing signal is a product of a second resistance value multiplied by a second capacitance value, the second resistance value is a total resistance of a plurality of resistances parallel connected to each other, and the plurality resistances are resistances between the touch spot and each of the part of the plurality of first driving electrodes;

determining a second coordinate according to the first sensing signal and the second sensing signal comprising:

computing a ratio of the first sensing signal to the second sensing signal; and determining the second coordinate according to the ratio of the first sensing signal to the second sensing signal, wherein the ratio of the first sensing signal to the second sensing signal is proportional to a ratio of a distance between the second coordinate and the first side to a distance between the second coordinate and the second side; and determining the touch spot according to the first coordinate and the second coordinate.

2. The method as claimed in claim 1, wherein the first sensing signal and the second sensing signal are resistor-capacitor signals.

3. A method for detecting a touch spot of a touch panel, the touch panel comprising a conductive film and a plurality of electrode pairs, the conductive film defining a first impedance direction and a second impedance direction substantially perpendicular to the first impedance direction, the plurality of electrode pairs being disposed along the first impedance direction, each of the plurality of electrode pairs comprising a first driving electrode and a second driving electrode separately located on two opposite sides of the conductive film, the two opposite sides are a first side and a second side, the method comprising:

scanning the plurality of electrode pairs along the first impedance direction to obtain an electrical signal curve; wherein the electrical signal curve is a resistor-capacitor signal curve comprising a plurality of resistor-capacitor values represented by $R_nC$, each of the plurality of resistor-capacitor values is a product of a resistance value multiplied by a capacitance value, the resistance value is a total resistance of a first resistance and a second resistance parallel connected to each other, the first resistance is a resistance between the touch spot and the first driving electrode, and the second resistance is a resistance between the touch spot and the second driving electrode;

determining a first coordinate according to the electrical signal curve by detecting a smallest resistor-capacitor value at the resistor-capacitor signal curve using:

a first formula $$\frac{X_X \Delta R_X C + X_y \Delta R_y C}{\Delta R_X C + \Delta R_y C},$$

wherein $\Delta R_X C = R_k C - R_X C$ and $\Delta R_y C = R_k C - R_y C$, when $R_x C$ is equal to $R_y C$;

a second formula $$\frac{X_Z \Delta R_Z C + X_y \Delta R_y C}{\Delta R_Z C + \Delta R_y C},$$

wherein $\Delta R_y C = R_k C - R_y C$ and $\Delta R_Z C = R_k C - R_Z C$, when $R_x C$ is different from $R_y C$, and $R_y C$ is equal to $R_Z C$;

a third formula $$\frac{X_X \Delta R_X C + X_y \Delta R_y C + X_Z \Delta R_Z C}{\Delta R_X C + \Delta R_y C + \Delta R_Z C},$$

wherein $\Delta R_X C = R_k C - R_X C$, $\Delta R_y C = R_k C - R_y C$, and $\Delta R_Z C = R_k C - R_Z C$; or a fourth formula $$\frac{\sum_{n=1}^{E} X_n \Delta R_n C}{\sum_{n=1}^{E} \Delta R_n C},$$

wherein $\Delta R_n C = R_k C - R_n C$, E is a total number of the plurality of electrode pairs, $R_X C$ is a smallest resistor-capacitor value, $R_y C$ is a second small resistor-capacitor value, $R_Z C$ is a third small resistor-capacitor value, and $R_k C$ is a greatest resistor-capacitor value of the resistor-capacitor signal curve;

selecting a plurality of first driving electrodes near the first coordinate and scanning the plurality of first driving electrodes to obtain a first sensing signal;

selecting a plurality of second driving electrodes near the first coordinate and scanning the plurality of second driving electrodes to obtain a second sensing signal;

determining a second coordinate according to the first sensing signal and the second sensing signal comprising:

computing a ratio of the first sensing signal to the second sensing signal; and determining the second coordinate according to the ratio of the first sensing signal to the second sensing signal, wherein the ratio of the first sensing signal to the second sensing signal is proportional to a ratio of a distance between the second coordinate and the first side to a distance between the second coordinate and the second side; and determining the touch spot according to the first coordinate and the second coordinate.

4. The method as claimed in claim 3, wherein the touch panel further comprises at least one driving circuit and at least one sensing circuit, and the step of scanning the plurality of electrode pairs along the first impedance direction further comprises:

inputting a pulse signal into each of the plurality of electrode pairs via the at least one driving circuit; and detecting a plurality of sensing signals from the plurality of electrode pairs via the at least one sensing circuit, wherein the electrical signal curve is obtained according to the plurality of sensing signals.

5. The method as claimed in claim 3, wherein the touch panel further comprises at least one driving circuit and at least one sensing circuit, and the step of scanning the plurality of first driving electrodes further comprises:

inputting a pulse signal into the plurality of first driving electrodes simultaneously via the at least one driving circuit; and detecting the first sensing signal from the plurality of first driving electrodes via the at least one sensing circuit.

6. The method as claimed in claim 5, wherein the step of scanning the plurality of second driving electrodes further comprises:

inputting a pulse signal into the plurality of second driving electrodes simultaneously via the at least one driving circuit; and detecting the second sensing signal from the plurality of second driving electrodes via the at least one sensing circuit.

7. The method as claimed in claim 3, wherein a line between the first driving electrode and the second driving electrode of each of the plurality of electrode pairs is substantially parallel to the second impedance direction.

8. The method as claimed in claim 3, wherein the conductive film is a carbon nanotube film comprising a plurality of successive and oriented carbon nanotubes joined end-to-end by van der Waals force therebetween.

9. The method as claimed in claim 8, wherein the plurality of carbon nanotubes are arranged along the second impedance direction.

10. The method as claimed in claim 3, wherein the first sensing signal and the second sensing signal are resistor-capacitor signals.

11. A method for detecting a touch spot of a touch panel, the touch panel comprising a substrate, a plurality of first driving electrodes, a plurality of second driving electrodes, and a conductive film disposed on the substrate, the conductive film comprising a first side and a second side, and defining a first impedance direction and a second impedance direction substantially perpendicular to the first impedance direction, the first side and the second side being substantially parallel to the first impedance direction, the plurality of first driving electrodes being disposed at the first side with a regular interval and electrically connected to the conductive film, the plurality of second driving electrodes being disposed at the second side with a regular interval and electrically connected to the conductive film, the plurality of first driving electrodes are respectively aligned with the plurality of second driving electrodes to form a plurality of electrode pairs, the method comprising:

scanning the plurality of electrode pairs along the first impedance direction to obtain an electrical signal curve, wherein the electrical signal curve comprising a plurality of resistor-capacitor values represented by $R_n C$;

determining a first coordinate according to the electrical signal curve by detecting a smallest resistor-capacitor value at the resistor-capacitor signal curve using:

a first formula $$\frac{X_X \Delta R_X C + X_y \Delta R_y C}{\Delta R_X C + \Delta R_y C},$$

wherein $\Delta R_X C = R_k C - R_X C$ and $\Delta R_y C = R_k C - R_y C$, when $R_x C$ is equal to $R_y C$;

a second formula $$\frac{X_Z \Delta R_Z C + X_y \Delta R_y C}{\Delta R_Z C + \Delta R_y C},$$

wherein $\Delta R_y C = R_k C - R_y C$ and $\Delta R_Z C = R_k C - R_Z C$, when $R_x C$ is different from $R_y C$, and $R_y C$ is equal to $R_Z C$;

a third formula $$\frac{X_X \Delta R_X C + X_y \Delta R_y C + X_Z \Delta R_Z C}{\Delta R_X C + \Delta R_y C + \Delta R_Z C},$$

wherein $\Delta R_X C = R_k C - R_X C$, $\Delta R_y C = R_k C - R_y C$, and $\Delta R_Z C = R_k C - R_Z C$; or a fourth formula $$\frac{\sum_{n=1}^{E} X_n \Delta R_n C}{\sum_{n=1}^{E} \Delta R_n C},$$

wherein $\Delta R_n C = R_k C - R_n C$, E is a total number of the plurality of electrode pairs, $R_X C$ is a smallest resistor-capacitor value, $R_y C$ is a second small resistor-capacitor value, $R_Z C$ is a third small resistor-capacitor value, and $R_k C$ is a greatest resistor-capacitor value of the resistor-capacitor signal curve;

selecting a part of the plurality of first driving electrodes near the first coordinate and scanning the part of the plurality of first driving electrodes to obtain a first sensing signal; wherein the first sensing signal is a product of a resistance value multiplied by a capacitance value, the resistance value is a total resistance of a plurality of resistances parallel connected to each other, and the plurality resistances are resistances between the touch spot and each of the part of the plurality of first driving electrodes;

selecting a part of the plurality of second driving electrodes near the first coordinate and scanning the part of the plurality of second driving electrodes to obtain a second sensing signal;

determining a second coordinate according to the first sensing signal and the second sensing signal comprising:

computing a ratio of the first sensing signal to the second sensing signal; and determining the second coordinate according to the ratio of the first sensing signal to the second sensing signal, wherein the ratio of the first sensing signal to the second sensing signal is proportional to a ratio of a distance between the second coordinate and the first side to a distance between the second coordinate and the second side; and determining the touch spot according to the first coordinate and the second coordinate.

12. The method as claimed in claim 11, wherein the touch panel further comprises at least one driving circuit and at least one sensing circuit, and the step of scanning the plurality of electrode pairs along the first impedance direction further comprises:

inputting a pulse signal into each of the plurality of electrode pairs via the at least one driving circuit; and detecting a plurality of sensing signals from the plurality of electrode pairs via the at least one sensing circuit, wherein the electrical signal curve is obtained according to the plurality of sensing signals.

13. The method as claimed in claim 11, wherein the touch panel further comprises at least one driving circuit and at least one sensing circuit, and the step of scanning the part of the plurality of first driving electrodes further comprises:

inputting a pulse signal into the part of the plurality of first driving electrodes simultaneously via the at least one driving circuit; and detecting the first sensing signal from the part of the plurality of first driving electrodes via the at least one sensing circuit.

14. The method as claimed in claim 13, wherein the step of scanning the part of the plurality of second driving electrodes further comprises:

inputting a pulse signal into the part of the plurality of second driving electrodes simultaneously via the at least one driving circuit; and detecting the second sensing signal from the part of the plurality of second driving electrodes via the at least one sensing circuit.

* * * * *